(12) United States Patent

Ho et al.

(10) Patent No.: US 7,829,004 B2
(45) Date of Patent: Nov. 9, 2010

(54) TRANSFER MOLDING METHOD AND SYSTEM FOR ELECTRONIC DEVICES

(75) Inventors: Shu Chuen Ho, Singapore (SG); Jian Wu, Singapore (SG); Lap Yu Jessie Chan, Singapore (SG)

(73) Assignee: ASM Technology Singapore Pte Ltd, Singapore (SG)

( * ) Notice: Subject to any disclaimer, the term of this patent is extended or adjusted under 35 U.S.C. 154(b) by 0 days.

(21) Appl. No.: 12/173,210

(22) Filed: Jul. 15, 2008

(65) Prior Publication Data

US 2010/0013120 A1 Jan. 21, 2010

(51) Int. Cl.
*B29C 70/78* (2006.01)
*B29C 45/02* (2006.01)
*B29C 45/33* (2006.01)

(52) U.S. Cl. ............. 264/272.15; 264/275; 264/272.11; 425/112; 425/125; 425/116

(58) Field of Classification Search ............ 264/272.15, 264/275, 272.11; 425/110, 116, 125, 112
See application file for complete search history.

(56) References Cited

U.S. PATENT DOCUMENTS

| | | | | |
|---|---|---|---|---|
| 3,594,463 A * | 7/1971 | Hestehave | ................... | 264/538 |
| 4,618,466 A * | 10/1986 | McGlashen et al. | ........ | 264/40.6 |
| 4,954,301 A * | 9/1990 | Saeki et al. | ................ | 264/40.1 |
| 4,954,307 A * | 9/1990 | Yokoyama | ............. | 264/272.15 |
| 5,049,055 A * | 9/1991 | Yokoyama | ................... | 425/116 |
| 5,133,921 A * | 7/1992 | Yokoyama | ............. | 264/272.15 |
| 5,603,879 A * | 2/1997 | Osada et al. | ................. | 264/102 |
| 5,783,134 A * | 7/1998 | Yabe et al. | ............. | 264/272.14 |
| 6,258,314 B1 * | 7/2001 | Oida et al. | ................... | 264/511 |
| 6,261,501 B1 * | 7/2001 | Miyagawa et al. | ..... | 264/272.15 |
| 6,491,509 B1 * | 12/2002 | Schad et al. | ................ | 425/130 |
| 6,518,204 B2 * | 2/2003 | Yamakawa et al. | .......... | 438/780 |
| 6,743,389 B2 | 6/2004 | Miyajima et al. | | |
| 7,651,958 B2 * | 1/2010 | Morita et al. | ............... | 438/781 |
| 2001/0013424 A1 * | 8/2001 | Takase et al. | ............... | 174/260 |
| 2002/0015748 A1 * | 2/2002 | Miyajima et al. | ............. | 425/89 |
| 2004/0026823 A1 * | 2/2004 | Thummel | .............. | 264/272.14 |
| 2005/0285306 A1 * | 12/2005 | Tsuchida | ............. | 264/272.15 |
| 2006/0119001 A1 * | 6/2006 | Thummel | .............. | 264/272.14 |
| 2008/0308969 A1 * | 12/2008 | Ogata et al. | ............ | 264/272.15 |
| 2009/0045548 A1 * | 2/2009 | Venrooij et al. | ........ | 264/272.15 |

* cited by examiner

*Primary Examiner*—Joseph S Del Sole
*Assistant Examiner*—Nahida Sultana
(74) *Attorney, Agent, or Firm*—Ostrolenk Faber LLP

(57) ABSTRACT

A method and system for molding an electronic device which is located next to a molding cavity and clamped to the molding cavity during molding, comprising providing molding compound in a mold supply pot, discharging the molding compound from the mold supply pot into a runner, and distributing the molding compound through the runner into the molding cavity in order to fill the molding cavity. A movable surface comprised in the molding cavity is positioned to form a first gap between the movable surface and the electronic device when the molding cavity is being filled. After filling the molding cavity with molding compound, the movable surface is driven to form a second gap between the movable surface and the electronic device which is smaller than the first gap, thereby compressing the molding compound in the molding cavity. A molded electronic device thus produced is then separated from the molding cavity.

9 Claims, 4 Drawing Sheets

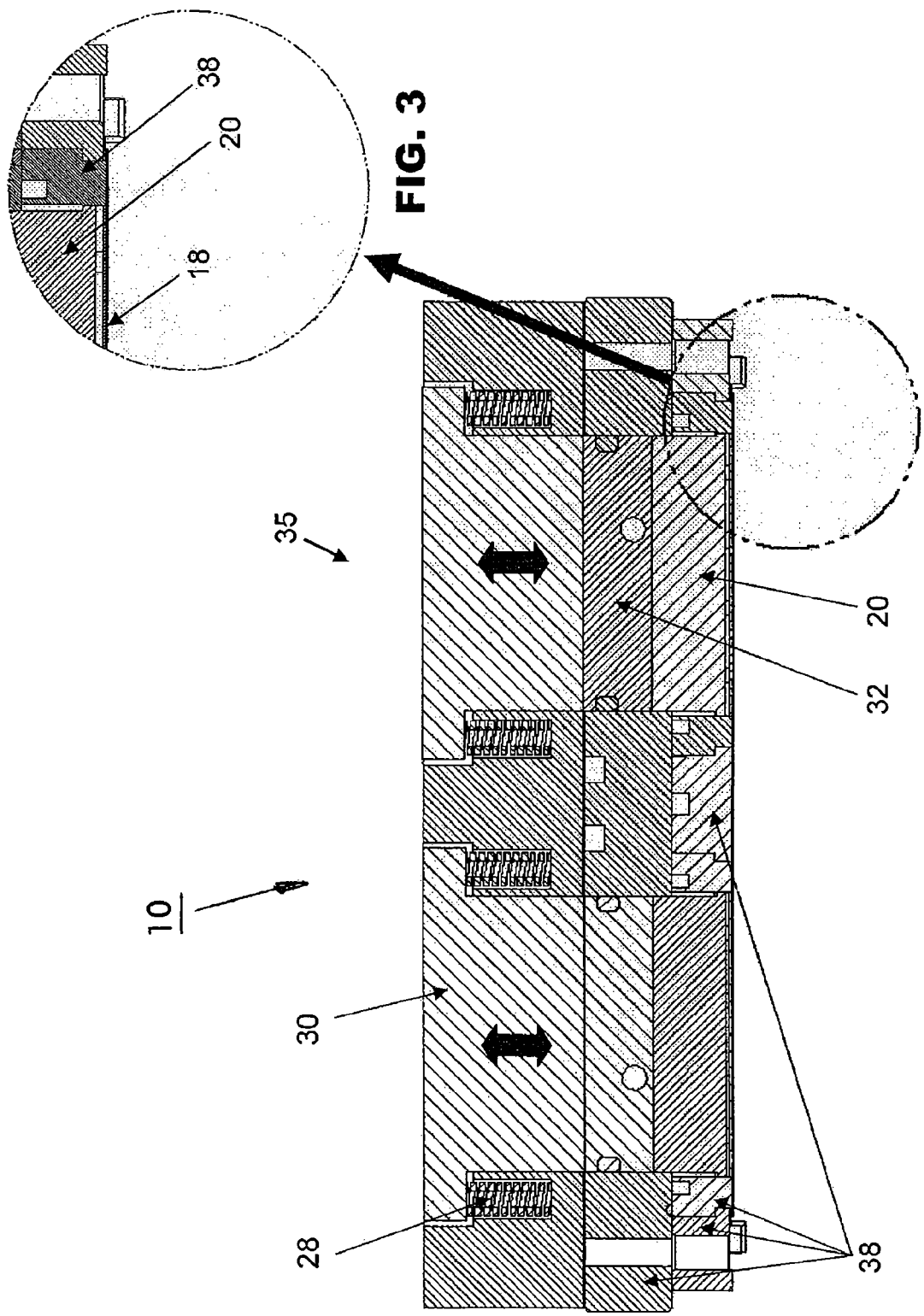

TRANSFER MOLDING METHOD AND SYSTEM FOR ELECTRONIC DEVICES

FIELD OF THE INVENTION

The invention relates to the molding of electronic devices, and in particular to a transfer molding system for molding electronic devices.

BACKGROUND AND PRIOR ART

Conventionally, transfer molding is employed for encapsulating electronic devices wherein molding compound is introduced as a solid pellet into a mold supply pot of a molding system and melted with the application of heat and pressure to a liquid state. The liquefied molding compound is then forced by a plunger into runners connected between the plunger and molding cavities to enter into molding cavities via narrow gates.

In modern packaging technology, semiconductor chips or dice are becoming increasingly thinner. The separation distances between wires connected to the semiconductor dice are also becoming smaller. Moreover, more complicated structures such as stacked dice have been developed. In these cases, if the height of the molding cavity is low and close to a die surface, such that transfer pressure is increased, a high molding compound injection speed resulting from conventional transfer molding will damage the dice or wires. The narrow gap increases resistance to the flow of the molding compound such that voids may arise in the resulting molded package. The problems encountered in transfer molding are especially evident when the gap between the top surface of a die and a top molding surface is reduced to less than 0.1 mm. Furthermore, a wider molding cavity to mold larger dice would make it more difficult for molding compound to perfectly fill the molding cavity. In such cases, the further the molding compound is propelled away from the gate, the more difficult it is for the ejected liquefied molding compound to properly fill the molding cavity.

To overcome the aforesaid problems associated with transfer molding of thin and/or wide packages, one approach is to conduct molding by dispensing liquid molding compound directly on top of the electronic devices to be molded, and then compressing the molding compound to encapsulate the electronic devices and to form the desired shape of the electronic package in a process known as compression molding. U.S. Pat. No. 6,743,389 entitled "Resin Molding Machine and Method of Resin Molding" describes a compression molding process wherein a spring-biased damper downwardly projected from a resin molding face allows the molding machine to apply a compacting force in a molding cavity after the mold is closed onto the electronic device.

Using compression molding, since molding compound in the form of liquid or paste resin is supplied individually onto each device which is encapsulated, complete filling up of the narrow gap between the dice and the molding cavity can be achieved without the above problems associated with transfer molding. Nevertheless, transfer molding remains a very popular molding method, since it is a cheap and efficient way to distribute molding compound from a single solid pellet to multiple molding cavities. In compression molding, liquid or paste resin has to be individually delivered to the multiple cavities. It would therefore be desirable to provide an improved transfer molding technique to achieve the respective benefits of transfer molding and compression molding in the same system.

SUMMARY OF THE INVENTION

It is thus an object of the invention to seek to provide a transfer molding system that is capable of molding large electronic packages or electronic packages with relatively low package heights more reliably as compared to conventional transfer molding system.

According to a first aspect of the invention, there is provided a method of molding an electronic device, comprising the steps of: providing a mold supply pot; providing molding compound in the mold supply pot; locating the electronic device next to a molding cavity and clamping the electronic device to the molding cavity; positioning a movable surface comprised in the molding cavity to form a first gap between the movable surface and the electronic device; discharging the molding compound from the mold supply pot into a runner and distributing the molding compound through the runner into the molding cavity in order to fill the molding cavity; after filling the molding cavity with said molding compound, driving the movable surface to form a second gap between the movable surface and the electronic device which is smaller than the first gap, whereby to compress the molding compound in the molding cavity and to produce a molded electronic device; and separating the molded electronic device from the molding cavity.

According to a second aspect of the invention, there is provided a molding system for molding an electronic device, comprising: a mold supply pot for receiving molding compound; a molding cavity comprising a movable surface for locating the electronic device, the electronic device being clamped to the molding cavity for molding; a runner fluidly connecting the molding cavity to the mold supply pot, the runner being operative to distribute molding compound discharged from the mold supply pot into the molding cavity to fill the molding cavity with molding compound; wherein, after the molding cavity is filled with molding compound, the movable surface comprised in the molding cavity is operative to move between a first position where it forms a first gap with the electronic device and a second position where it forms a second gap with the electronic device which is smaller than the first gap, so as to compress the molding compound that has filled the molding cavity.

It will be convenient to hereinafter describe the invention in greater detail by reference to the accompanying drawings, which illustrate the preferred embodiments of the invention. The particularity of the drawings and the related description is not to be understood as superseding the generality of the broad identification of the invention as defined by the claims.

BRIEF DESCRIPTION OF THE DRAWINGS

Examples of preferred embodiments of a molding system in accordance with the invention will now be described with reference to the accompanying drawings, in which:

FIG. 2 is a cross-sectional view of a top mold half of the molding system incorporating a first preferred embodiment of a compression mechanism for reducing a volume of a molding cavity;

FIG. 3 is an enlarged view of a bottom corner of the top mold half of FIG. 2;

DETAILED DESCRIPTION OF THE PREFERRED EMBODIMENTS OF THE INVENTION

Figure 1A:
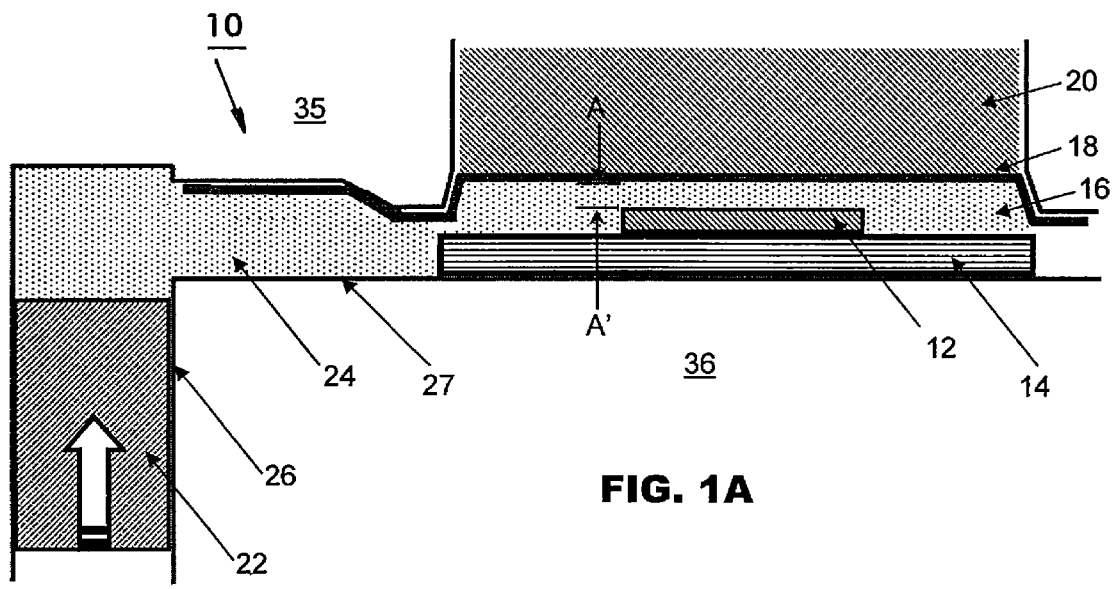
FIGS. 1A and 1B are schematic sectional views of a molding system according to the preferred embodiment of the invention.
Figure 1B:
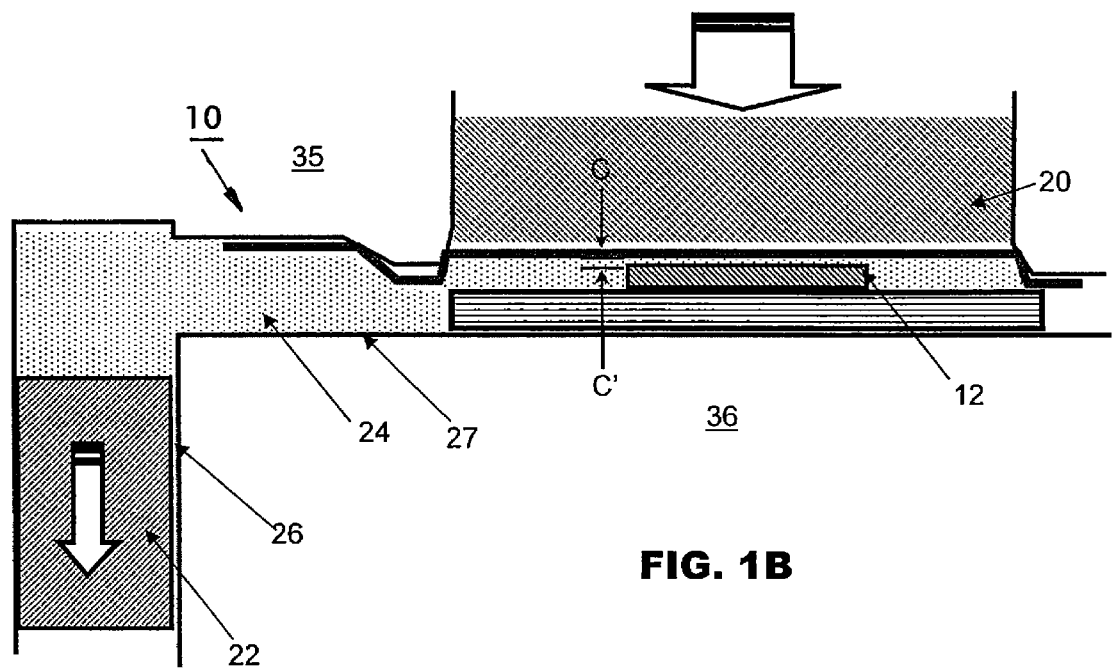

FIGS. 1A and 1B are schematic sectional views of a molding system 10 according to the preferred embodiment of the invention. The molding system generally comprises first and second mold halves, such as a top mold half 35 and a bottom mold half 36 that are movable relative to each other. FIG. 1A illustrates an electronic device in the form of a die 12 supported on a leadframe 14 or other substrate which is to be molded by the molding system. The electronic device is positioned and clamped to a molding cavity 16 for molding, with the die 12 generally being located inside the molding cavity 16. A length of film 18 is used to cover the molding surfaces of the top mold half 35 during molding, as well as a contact portion of the top mold half 35 which clamps onto the bottom mold half 36.

A movable surface, such as a top cavity plate 20 comprised in the molding cavity 16, is located over and covered by the film 18 and is operative to provide a compacting force on molding compound 24 encapsulating the die 12. This is achieved by means of moving the top cavity plate 20 between a first position where it forms a first gap A-A' with the top surface of the die 12 and a second position where it forms a second gap C-C' with the die 12, the second gap being smaller than the first gap A-A'. This reduces the volume of the molding cavity 16 and compresses the molding compound 24 in the molding cavity 16 to produce a molded electronic device. After molding, the molded electronic device is separated from the molding cavity 16.

Molding compound 24 is provided as a solid pellet to a mold supply pot 26 formed in the bottom mold half 36 which receives the solid pellet and provides molding compound 24 to the molding cavity 16. A plunger 22 located in the mold supply pot 26 is operative to crush the solid pellet, causing liquefied molding compound 24 to flow out and to be discharged from the mold supply pot 26 located above the plunger 22 through runners 27 into the molding cavity 16. The runners 27 fluidly connect the mold supply pot 26 to the molding cavity 16, such that molding compound 24 fills the molding cavity 16. When filling the molding cavity 16 with molding compound 24, the height of the movable top cavity plate 20 may be maintained at the first gap A-A' such that the first gap A-A' is sufficiently wide to allow molding compound 24 to flow with little resistance over the top surface of the die 12 to cover the surface of the die 12 in the molding cavity 16 completely.

In FIG. 1B, the movable top cavity plate 20 pushes downwards and compresses molding compound 24 to reduce the gap from the first gap A-A' to the second gap C-C'. By compressing the molding compound, the top cavity plate 20 may push some molding compound 24 out of the molding cavity 16 back towards the mold supply pot 26. As a result, a very thin layer of molding compound 24 of a thickness C-C', such as 0.1 mm from the top of the die 12 to the molding surface of the top cavity plate 20, can be effectively formed on the top surface of the die 12 by means of transfer molding using traditional solid pellets of molding compound 24.

FIG. 2 is a cross-sectional view of a top mold half 35 of the molding system 10 incorporating a first preferred embodiment of a compression mechanism for reducing a volume of the molding cavity 16. The top mold half 35 comprises a top chase plate 30, an intermediate plate 32, and the top cavity plate 20. The top chase plate 30 is connected to a motor (not shown) and the top cavity plate 20 is operatively connected to the motor through the top chase plate 30 and the intermediate plate 32. The motor drives the top cavity plate 20 from its first position to its second position towards the die 12 by reducing the gap above the die 12 from the first gap A-A' to the second gap C-C'.

The top chase plate 30, the intermediate plate 32, and the top cavity plate 20 are movable together. The top cavity plate 20 and the other plates coupled to it are resiliently attached to an outer ring 38 by way of a resilient mechanism, such as a spring 28. The outer ring 38 is preferably rigidly fixed and not movable, but the top chase plate 30, intermediate plate 32 and top cavity plate 20 are movable relative to the outer ring 38.

FIG. 3 is an enlarged view of a bottom corner of the top mold half 35 of FIG. 2. The film 18 is located between the leadframe 14 and the top mold half 35. The outer ring 38 surrounds the top cavity plate 20. The volume of the molding cavity 16 is reduced when the top cavity plate 20 is lowered downwards towards the leadframe 14.

Figures 4A, 4B:
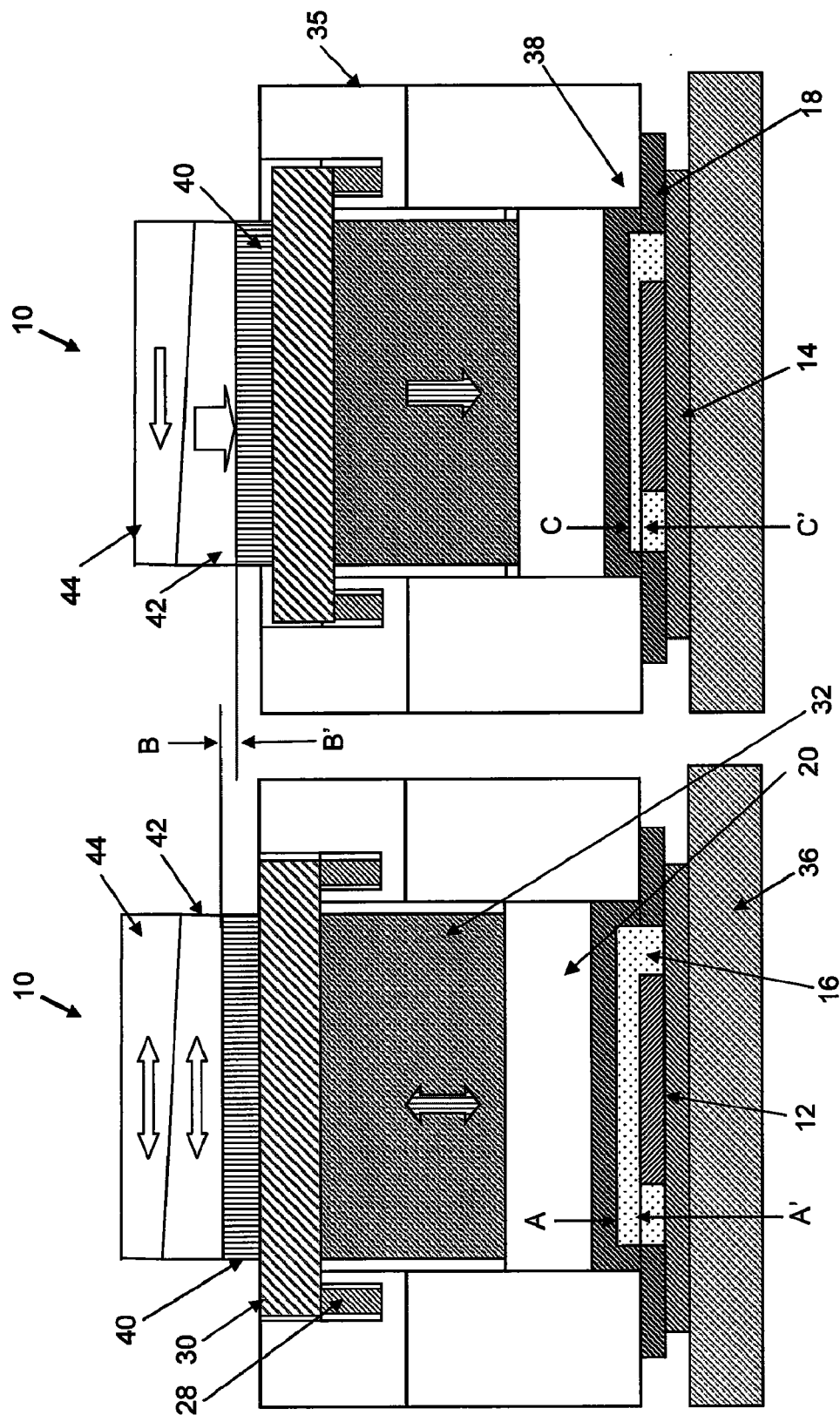
FIGS. 4A and 4B are schematic sectional views of the molding system of FIG. 2 illustrating the operation of the compression mechanism for reducing the volume of the molding cavity.

FIGS. 4A and 4B are schematic sectional views of the molding system 10 of FIG. 2 illustrating the operation of the compression mechanism for reducing the volume of the molding cavity 16. The die 12 is supported on a leadframe 14 and received on the bottom mold half 36 beneath the film 18 in the molding cavity 16. In FIG. 4A, air is drawn from the molding cavity 16 by a vacuum source (not shown) to allow greater contact between the film 18 and the molding surface of the molding cavity 16. This facilitates the formation of the shape of the molded die by avoiding having the molding compound 24 being squeezed out by the film 18 during molding.

The leadframe 14 with the die 12 is supported on the bottom mold half 36. The top mold half 35 is lowered to contact the bottom mold half 36 such that a contact portion comprised in the outer ring 38 of the top mold half 35 is operative to clamp onto the leadframe 14. In this way, a clamping force is exerted to obtain the required sealing force between the fixed ring 38 and the leadframe 14. The top cavity plate 20 is configured to move relative to the contact portion and is further arranged on a side of the molding cavity 16 which is opposite to and facing the die 12. A sufficiently wide clearance A-A' between the die 12 and the top cavity plate 20 is provided to reduce a resistance force inhibiting the flow of the molding compound 24 into the molding cavity 16. The gap A-A' also avoids problems with overly high injection pressure causing wire sweep that damages the die 12. The molding cavity 16 and, in particular the gap A-A', is thus reliably filled with the molding compound 24 by way of transfer molding.

The compression mechanism for reducing the volume of the molding cavity 16, which may incorporate a wedge clamp plate 40, is located on the top chase plate 30 and may be connected to a motor such as a servo motor (not shown) which controls a wedge device comprising first and second wedge-shaped blocks 42, 44 which are operatively connected to the wedge clamp plate 40 and the servo motor. The servo motor activates and drives the first wedge-shaped block 42 to move by sliding relative to the second wedge-shaped block 44 in a direction which is substantially perpendicular to a direction of movement of the top cavity plate 20 so as to actuate the top cavity plate 20 towards the die 12. Therefore, when activated, the first and second wedge-shaped blocks 42, 44 slide relative to each other and push the wedge clamp plate 40 downwards. This pushes the top chase plate 30 together with the intermediate plate 32 and the top cavity plate 20 downwards by a distance of B-B'. The top cavity plate 20 compresses the molding compound 24 in the molding cavity 16, providing a compacting force on the molding compound 24 in the molding cavity 16 to shape the molded package. The wedge clamp plate 40 reduces the gap A-A' by a distance of B-B' as shown in FIG. 4B so that the gap becomes C-C'. When the driving force of the servo motor is deactivated, the compression force by the spring 28 is released and the top cavity plate 20, to which the spring 28 is operatively connected, springs upwards away from the die 12 to the standby position as shown in FIG. 4A.

Figure 5:
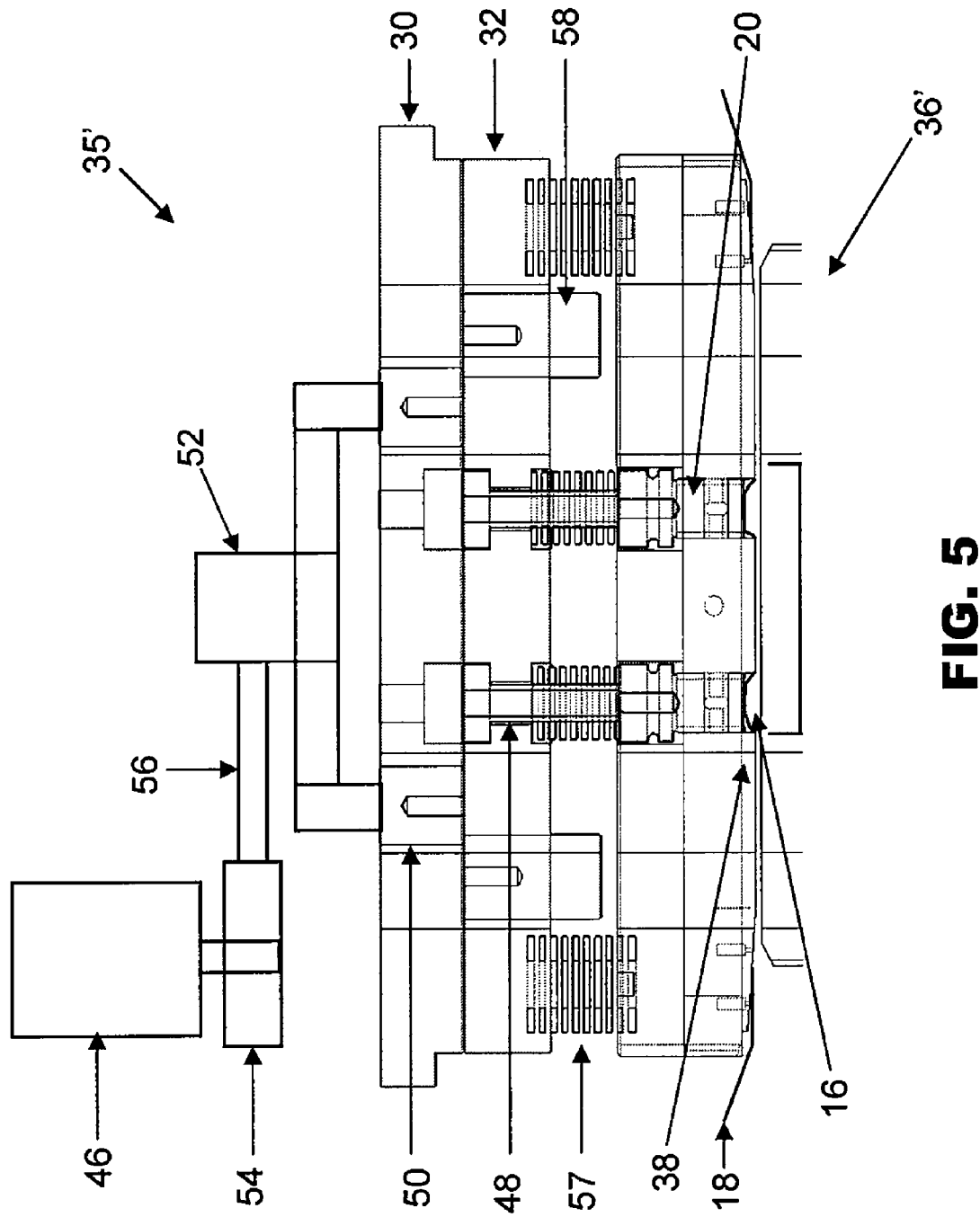
FIG. 5 is a sectional view of a molding system incorporating a second preferred embodiment of a compression mechanism for reducing the volume of the molding cavity.

FIG. 5 is a sectional view of a molding system incorporating a second preferred embodiment of a compression mechanism for reducing the volume of the molding cavity 16. In this embodiment, the compression force on the molding compound 24 is provided by direct drive means such as a servo motor 46 which drives the top cavity plate 20 to move relative to fixed portions of the top mold half 35' towards the bottom mold half 36'. The top mold half 35' may include a plurality of molding cavities 16 and pistons 48 that are movable within the top mold half 35'. Each of the pistons 48 may be driven against a side of a respective molding cavity 16, so as to provide a compacting force to the molding compound 24 located in the molding cavity 16 during molding. When the pistons 48 are retracted, they create a gap between the top of the molding cavities 16 and the bottom surfaces of the top cavity plates 20. When the pistons 48 are fully extended, the top cavity plates 20 close onto the top of the molding cavities 16 to compact the molding compound 24 therein, and to form a desired shape of the molded compound 24 on the die 12.

The pistons 48 are operatively connected to the intermediate plate 32, which is in turn operatively connected to push pillars 50 in the top chase plate 30 in order to allow all the pistons 48 to be operated simultaneously to drive them relative to the molding cavities 16. In order to drive the push pillars 50 to operate the pistons 48 through driving the intermediate plate 32, a force may be activated to push the push pillars 50 by any suitable means to provide an adequate compacting force. This pushing force may be actuated by the servo motor 46 which is operatively linked to the push pillars 50 through a top gear box and linkage mechanism 52, transmitting the driving force via a pulley 54 and belt 56 mechanism. The top gear box and linkage mechanism 52 relays an actuating force originating from the servo motor 46 onto the push pillars 50.

As the intermediate plate 32 moves the top cavity plates 20 against the top of the molding cavities 16, a stopper 58 stops motion of the intermediate plate 32 at a predetermined distance from the fixed ring 38 to maintain a separation distance between the intermediate plate 32 and the bottom mold half 36'. At this point, the top cavity plates 20 have closed onto the top of the molding cavities 16 for compacting the molding compound 24, and motion of the pistons 48 is also stopped.

Springs 57 are arranged on the top mold half 35' between the intermediate plate 32 and the fixed ring 38 to provide a preload force therebetween in order to bias the intermediate plate 32 to lift the top cavity plate 20 in the absence of a driving force from the servo motor 46. After molding is completed, the servo motor 46 is switched off and the springs 57 cause the top cavity plates 20 to rest at their standby positions away from the molding cavities 16.

It should be appreciated that the molding system as described in the preferred embodiment of the invention requires insubstantial modification of a conventional transfer molding system in order to mold electronic devices more reliably. The resulting molding system benefits from the advantages of transfer molding while avoiding the low productivity and inefficiency inherent in common compression molding processes.

The invention described herein is susceptible to variations, modifications and/or additions other than those specifically described and it is to be understood that the invention includes all such variations, modifications and/or additions which fall within the spirit and scope of the above description.

The invention claimed is:

1. Method of molding an electronic device, comprising the steps of:

providing a mold supply pot;

providing molding compound in the mold supply pot;

locating the electronic device next to a molding cavity and clamping the electronic device to the molding cavity;

positioning a movable mold surface comprised in the molding cavity to form a first gap between the movable mold surface and the electronic device;

discharging the molding compound from the mold supply pot into a runner and distributing the molding compound through the runner into the molding cavity until the molding cavity is completely filled;

after filling the molding cavity with said molding compound, driving the movable mold surface to form a second gap between the movable mold surface and the electronic device which is smaller than the first gap, whereby to compress the molding compound in the molding cavity and to produce a molded electronic device; and separating the molded electronic device from the molding cavity, wherein the movable mold surface is maintained at the position where it forms the first gap with the electronic device throughout the discharging step.

2. Method as claimed in claim 1, wherein the step of compressing the molding compound in the molding cavity further comprises the step of pushing some molding compound out of the molding cavity towards the mold supply pot.

3. Method as claimed in claim 1, wherein the molding compound is provided to the mold supply pot as a solid pellet.

4. Method as claimed in claim 3, wherein the step of discharging the molding compound from the mold supply pot further comprises the step of crushing the solid pellet with a plunger whereby to cause the molding compound to flow out of the mold supply pot.

5. Method as claimed in claim 1, wherein the movable mold surface comprises a cavity plate arranged on a side of the molding cavity which is opposite to and facing the electronic device.

6. Method as claimed in claim 5, wherein the step of driving the cavity plate to form the second gap with the electronic device comprises the step of using a motor to drive the cavity plate towards the electronic device.

7. Method as claimed in claim 6, wherein the motor drives a first wedge-shaped block relative to a second wedge-shaped block in a direction which is substantially perpendicular to a direction of movement of the cavity plate so as to actuate said movement of the cavity plate towards the electronic device.

8. Method as claimed in claim 6, further comprising the step of biasing the cavity plate with a resilient mechanism to move in a direction away from the electronic device after a driving force from the motor is deactivated.

9. Method of molding an electronic device, comprising the steps of:

providing a mold supply pot;

providing molding compound in the mold supply pot;

locating the electronic device next to a molding cavity and clamping the electronic device to the molding cavity;

positioning a movable mold surface comprised in the molding cavity to form a first gap between the movable mold surface and the electronic device;

discharging the molding compound from the mold supply pot into a runner and distributing the molding compound through the runner into the molding cavity until the molding cavity is completely filled;

after filling the molding cavity with said molding compound, driving the movable mold surface to form a second gap between the movable mold surface and the electronic device which is smaller than the first gap, whereby to compress the molding compound in the molding cavity and to produce a molded electronic device; and separating the molded electronic device from the molding cavity.

* * * * *